United States Patent
Wakabayashi et al.

(10) Patent No.: US 6,636,297 B2
(45) Date of Patent: Oct. 21, 2003

(54) VACUUM ULTRAVIOLET LASER WAVELENGTH MEASURING APPARATUS

(75) Inventors: Osamu Wakabayashi, Hiratsuka (JP); Tatsuo Enami, Yokohama (JP); Shinji Nagai, Hiratsuka (JP)

(73) Assignee: Gigaphoton, Inc., Tokyo (JP)

( * ) Notice: Subject to any disclaimer, the term of this patent is extended or adjusted under 35 U.S.C. 154(b) by 35 days.

(21) Appl. No.: 09/842,230

(22) Filed: Apr. 26, 2001

(65) Prior Publication Data

US 2002/0159064 A1 Oct. 31, 2002

(51) Int. Cl.[7] .............. G01J 3/00; G01J 1/58
(52) U.S. Cl. .............. 356/51; 250/365; 250/472.1; 250/483.1; 372/32
(58) Field of Search .............. 250/361 R, 362, 250/363.01, 365, 368, 458.1, 459.1, 461.1, 483.1, 472.1; 356/51, 305, 213, 218, 225; 372/32

(56) References Cited

U.S. PATENT DOCUMENTS

| | | | | |
|---|---|---|---|---|
| 3,765,769 A | * | 10/1973 | Treacy | 356/305 |
| 4,015,130 A | * | 3/1977 | Landry et al. | 250/372 |
| 4,916,319 A | * | 4/1990 | Telfair et al. | 250/461.1 |
| 5,696,623 A | * | 12/1997 | Fujie et al. | 355/30 |
| 5,982,800 A | * | 11/1999 | Ishihara et al. | 372/102 |
| 6,114,704 A | * | 9/2000 | Buck | 250/372 |
| 6,212,217 B1 | * | 4/2001 | Erie et al. | 372/102 |
| 6,320,663 B1 | * | 11/2001 | Ershov | 356/454 |
| 6,324,203 B1 | * | 11/2001 | Owa | 372/106 |
| 6,327,284 B1 | * | 12/2001 | Stamm et al. | 250/372 |
| 6,330,260 B1 | * | 12/2001 | Onkels et al. | 372/38.04 |
| 6,396,062 B1 | * | 5/2002 | Buck et al. | 250/330 |
| 6,539,037 B1 | * | 3/2003 | Shio et al. | 372/29.02 |

FOREIGN PATENT DOCUMENTS

| | | | | |
|---|---|---|---|---|
| JP | 64-091024 A | * | 4/1989 | |
| JP | 06-79478 A | * | 3/1994 | |
| JP | 06-221917 A | * | 8/1994 | 250/361 R |
| JP | 2000-146687 | | 5/2000 | |
| JP | 2000-151001 | | 5/2000 | |
| JP | 2000-208835 A | * | 7/2000 | |

* cited by examiner

*Primary Examiner*—John Juba
(74) *Attorney, Agent, or Firm*—Armstrong, Westerman & Hattori, LLP

(57) ABSTRACT

A vacuum ultraviolet laser wavelength measuring apparatus capable of accurately measuring wavelength characteristics of a laser beam. The wavelength measuring apparatus has spectral devices for generating an optical pattern corresponding to wavelength characteristics of an incident laser beam and measuring wavelength characteristics of a laser beam in a vacuum ultraviolet region oscillating from a vacuum ultraviolet laser on the basis of the optical pattern. The apparatus has a fluorescent screen for generating a fluorescent pattern having an intensity distribution corresponding to an intensity distribution of the incident optical pattern, a pattern detector for measuring the intensity distribution of the fluorescent pattern, and arithmetic unit for calculating the wavelength characteristics of the laser beam on the basis of the measured intensity distribution.

7 Claims, 4 Drawing Sheets

VACUUM ULTRAVIOLET LASER WAVELENGTH MEASURING APPARATUS

FIELD OF THE INVENTION

The present invention relates to a wavelength measuring apparatus for measuring wavelength characteristics of a laser beam oscillating from a vacuum ultraviolet laser.

BACKGROUND OF THE INVENTION

Conventionally there is known a vacuum ultraviolet laser emitting a laser beam 11 having a wavelength of approx. 20 nm to 200 nm referred to as vacuum ultraviolet region such as, for example, ArF lasers (193 nm) and F2 lasers (157 nm).

This type of vacuum ultraviolet laser is mainly used for precision processing such as laser lithography or the like. To favorably perform the precision processing, it is necessary to mount a wavelength selecting element on the vacuum ultraviolet laser so as to stabilize a center wavelength of the laser beam applied to an object to be processed and to narrow a spectral width of the wavelength (it is referred to as narrowing a laser beam band).

Furthermore, to preferably perform the precision processing, the center wavelength and the spectral width (hereinafter, generally referred to as wavelength characteristics) of the above laser beam need to be limited within a predetermined allowable range. For this purpose, the wavelength characteristics of the laser beam 11 having the narrowed band must accurately be measured and controlled on the basis of the measured values.

Referring to FIG. 5, there is shown a configurational view of an F2 laser unit having a wavelength measuring apparatus related to a prior art.

In FIG. 5, the F2 laser unit 1 comprises a laser chamber 2 enclosing laser gas and emitting a laser beam 11 by causing an electric discharge inside, a band narrowing unit 10 for narrowing a band of the laser beam 11 emitted from the laser chamber 2, a wavelength measuring apparatus 3 for measuring wavelength characteristics of the laser beam 11, and a wavelength controller 4 for controlling the wavelength characteristics of the laser beam 11 whose band has been narrowed so as to be limited within an allowable range with being electrically connected to the wavelength measuring apparatus 3 and the band narrowing unit 10.

The laser chamber 2 encloses laser gas such as, for example, fluorine (F2) and helium (He) at a predetermined pressure ratio. A pair of discharge electrodes (not shown) are installed in a predetermined position inside the laser chamber 2 and the laser beam 11 is caused to oscillate by applying a high voltage between the discharge electrodes.

A rear window 9 at a rear end (left-handed in the drawing) of the laser chamber 2 transmits the oscillating laser beam 11 and then the laser beam is incident on the band narrowing unit 10 arranged externally at the back of the laser chamber 2. Inside the band narrowing unit 10, an etalon, a grating, or other wavelength selecting elements (not shown) are arranged in predetermined positions to narrow the band of the laser beam 11.

The laser beam 11 whose band has been narrowed passes through the laser chamber 2 and penetrates through a front window 7 at a front end of the laser chamber 2, and then a part of it partially penetrates through a front mirror 8 arranged externally ahead of the laser chamber 2 to be emitted to the outside.

At this point, a beam splitter 12 is arranged on an optical axis of the laser beam 11 in order to measure the wavelength characteristics of the emitted laser beam 11. The laser beam 11 is partially reflected downward by the beam splitter 12 to generate a sample beam 11A and it is incident on the wavelength measuring apparatus 3, so that its wavelength characteristics are measured.

The wavelength measuring apparatus 3 comprises a diffuser panel 24 for diffusing the sample beam 11A, a monitor etalon 25 for generating an interference pattern 29 corresponding to the wavelength characteristics of the diffused sample beam 11A, a first imaging lens 27 for imaging this interference pattern 29, a pattern detector 17 (for example, a line sensor) for measuring an intensity distribution of the imaged interference pattern 29, and an arithmetic unit 28 for calculating the wavelength characteristics of the sample beam 11A on the basis of an output from the pattern detector 17.

This arithmetic unit 28 transmits the wavelength characteristics of the calculated sample beam 11A to the wavelength controller 4. The wavelength controller 4 outputs a command signal to the band narrowing unit 10 on the basis of the wavelength characteristics and controls the band narrowing unit 10 so that the wavelength characteristics of the laser beam 11 are limited within a predetermined range. This feedback control enables the wavelength characteristics of the laser beam 11 to be controlled.

The prior art set forth in the above, however, has problems described below.

In other words, the interference pattern 29 has the same wavelength as for the laser beam 11. Light in the vacuum ultraviolet region has a short wavelength and receives very large energy of photons inversely proportional to a wavelength. Therefore, the pattern detector 17 is damaged by the energy of photons of the incident interference pattern 29, by which the wavelength characteristics cannot be measured accurately.

In addition, this causes the measured values of the wavelength characteristics of the laser beam 11 to be inaccurate, which results in a fluctuation of the wavelength characteristics of the laser beam 11 controlled by the wavelength controller 4 on the basis of the measured values. It further fluctuates the wavelength characteristics of the laser beam 11 applied to an object to be processed, which results in a fluctuation of a focal position of the laser beam 11 inside a processing machine which is not shown and causes a precision processing failure.

Furthermore, the wavelength characteristics are measured at all times during processing and a signal for halting the processing is outputted to the processing machine when the wavelength characteristics deviate from a predetermined range. In this condition, the inaccurate measurements of the wavelength characteristics causes the processing to be halted in spite of favorable wavelength characteristics or to be continued in spite of poor wavelength characteristics.

DISCLOSURE OF THE INVENTION

The present invention has been provided in view of the above problems. It is an object of the present invention to provide an apparatus for measuring a wavelength of a vacuum ultraviolet laser, capable of accurately measuring wavelength characteristics of the laser beam.

To achieve the above object, in accordance with a first aspect of the present invention, there is provided a vacuum ultraviolet laser wavelength measuring apparatus having spectral means for generating an optical pattern corresponding to wavelength characteristics of an incident laser beam and measuring wavelength characteristics of a laser beam in a vacuum ultraviolet region oscillating from a vacuum ultraviolet laser on the basis of the optical pattern, comprising: a fluorescent screen for generating a fluorescent pattern having an intensity distribution corresponding to an intensity distribution of the incident optical pattern, a pattern detector for measuring the intensity distribution of the fluorescent pattern generated from the fluorescent screen, and an arithmetic unit for calculating the wavelength characteristics of the laser beam on the basis of the intensity distribution of the measured fluorescent pattern.

With these features, an interference pattern or other optical pattern generated by the spectral means is caused to be incident on the fluorescent screen, the intensity distribution of the fluorescent pattern generated from the fluorescent screen is measured by the pattern detector, and the wavelength characteristics of the laser beam are calculated by the arithmetic unit on the basis of the measured values.

As set forth in the above, the wavelength characteristics of the laser beam can be measured without causing the laser beam to be directly incident on the pattern detector by measuring the intensity distribution of the fluorescent pattern. A fluorescent light has a longer wavelength than the laser beam in the vacuum ultraviolet region and has a small energy of photon, and therefore it does not damage the pattern detector unlike the laser beam directly incident. This reduces troubles of the wavelength measuring apparatus, thereby improving an operating efficiency of the vacuum ultraviolet laser.

In addition, the wavelength characteristics of the laser beam from the vacuum ultraviolet laser can always be measured accurately, thereby enabling a precise control of the wavelength characteristics based on the measured values. This makes it possible to irradiate an object to be processed with a laser beam having wavelength characteristics within a predetermined allowable range when the vacuum ultraviolet laser is used as a light source for precision processing such as laser lithography.

Preferably according to a second arrangement, the fluorescent screen in the first aspect of the invention is coated with a fluorescent substance on its surface in one side, the optical pattern is caused to be obliquely incident on the fluorescent screen at a predetermined incident angle, a fluorescent pattern having an intensity distribution corresponding to an intensity distribution of the obliquely incident optical pattern is generated on the surface in the side, and the fluorescent pattern is imaged on the pattern detector by using a second imaging lens.

According to the second arrangement, the fluorescent screen is coated with a fluorescent substance on its surface in the side, the optical pattern is caused to be obliquely incident on the fluorescent screen, the fluorescent pattern having the intensity distribution corresponding to the intensity distribution of the incident optical pattern is generated on the surface in the side, and the fluorescent pattern is imaged on the pattern detector, by which the same action and effect as for the first aspect of the invention is achieved.

A third arrangement may be such that the spectral means in the first aspect of the present invention comprises a plurality of concave mirrors and a diffraction grating for diffracting a laser beam at an angle corresponding to the wavelength characteristics of the incident laser beam, wherein the fluorescent pattern having an intensity distribution corresponding to an intensity distribution of the diffracted beam is generated in the other side of fluorescent screen and wherein the fluorescent pattern is imaged on the pattern detector by using the second imaging lens.

According to the third arrangement, the spectral means comprises the plurality of concave mirrors and the diffraction grating for diffracting the laser beam at the angle corresponding to the wavelength characteristics of the incident laser beam, wherein the fluorescent pattern having the intensity distribution corresponding to the intensity distribution of the diffracted beam is generated on the fluorescent screen and wherein the fluorescent pattern is imaged on the pattern detector, by which the same action and effect as for the first aspect of the invention is achieved.

A fourth arrangement according to the first, second, or third arrangement may further comprise an ultraviolet filter which does not transmit the laser beam in the vacuum ultraviolet region and transmits the laser beam having a wavelength close to a wavelength of the fluorescent pattern in the front of the pattern detector.

According to the fourth arrangement, there is provided an ultraviolet filter which does not transmit the laser beam in the vacuum ultraviolet region in the front of the pattern detector and therefore the laser beam irregularly reflected on a surface or the like of the fluorescent screen does not reach the pattern detector, thereby preventing the pattern detector from being damaged.

A fifth arrangement according to the first, second, or third arrangement may be such that a cover is put on at least an entire optical path of the laser beam and the wavelength measuring apparatus and a space inside the cover is kept in an oxygen-free condition.

According to the fifth arrangement, the cover is put on at least the entire optical path of the laser beam and the wavelength measuring apparatus and the space inside the cover is kept in the oxygen-free condition, by which the laser beam is not absorbed by oxygen in the air, thereby preventing its power from attenuating.

A sixth arrangement according to the first, second, or third arrangement may be such that the fluorescent screen has a movable actuator which is movable by a predetermined distance perpendicularly to an optical axis of the incident laser beam and is movably installed by this movable actuator.

According to the sixth arrangement, the fluorescent screen can be moved by the predetermined distance by the movable actuator, thereby reducing deterioration of the fluorescent substance and therefore extending a life of the fluorescent screen.

DETAILED DESCRIPTION OF THE PREFERRED EMBODIMENTS

Figure 1:
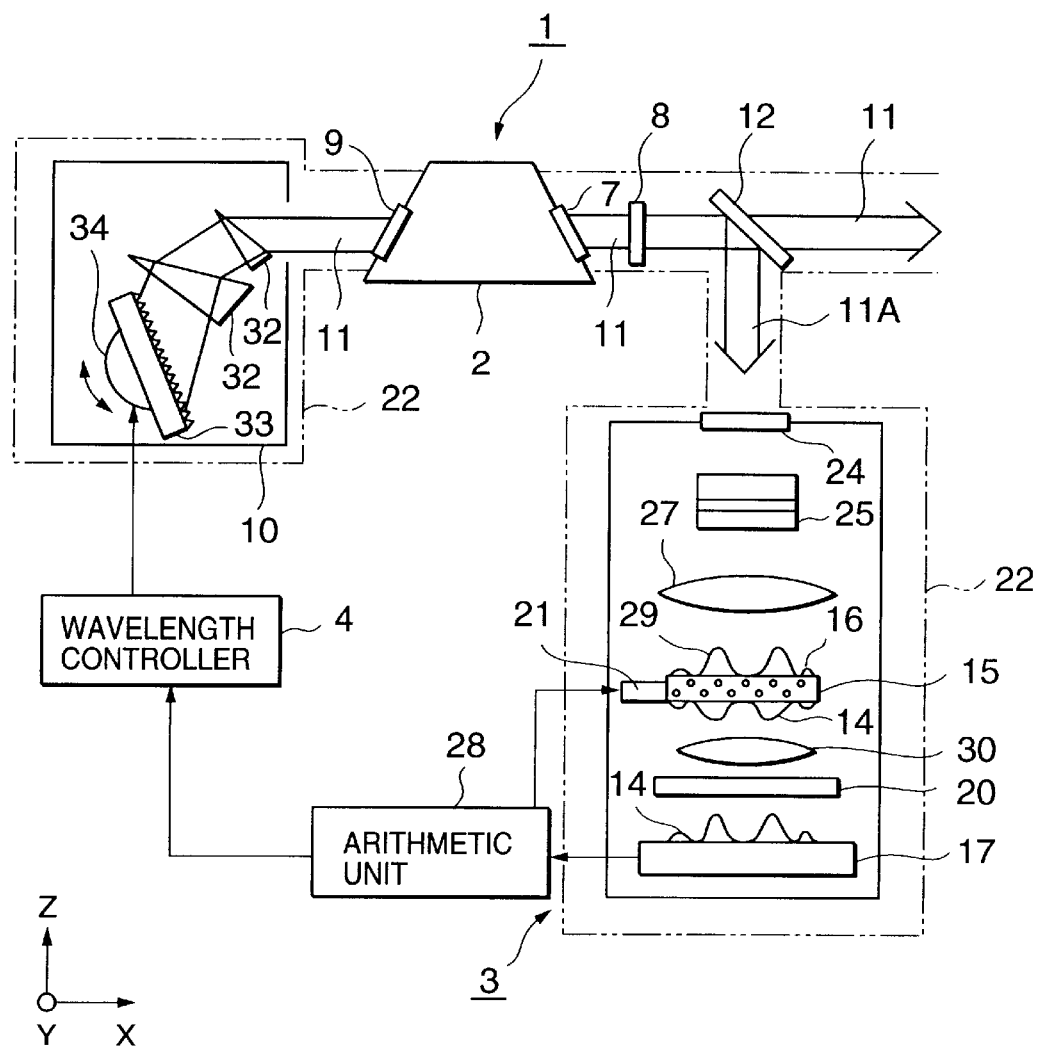
FIG. 1 is a configurational diagram of an F2 laser unit having a wavelength measuring apparatus according to a first embodiment of the present invention.

Embodiments of the present invention will be described below by referring to the accompanying drawings. In the embodiments, like reference numerals are given to like elements identical to those in the drawing used for the description of the above prior art and in drawings used for description of embodiments previous to the currently described embodiment.

Figure 2:
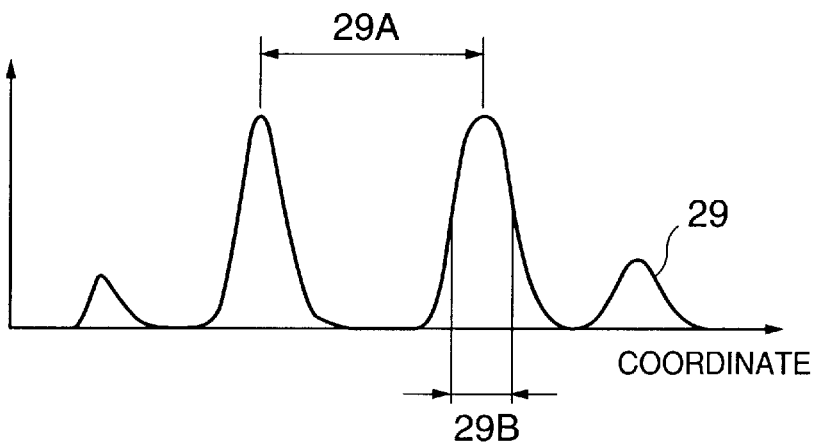
FIG. 2 is an explanatory diagram of an intensity distribution of an interference pattern generated according to the first embodiment.

First, a first embodiment of the present invention will be described below on the basis of FIG. 1 to FIG. 3. This embodiment is described with giving an example of an F2 laser unit as a vacuum ultraviolet laser. Referring to FIG. 1, there is shown a configurational diagram of the F2 laser unit having a wavelength measuring apparatus according to this embodiment.

The F2 laser unit 1 comprises a laser chamber 2 enclosing laser gas and emitting a laser beam 11 by causing an electric discharge inside, a band narrowing unit 10 for narrowing a band of the laser beam 11 emitted from the laser chamber 2, a wavelength measuring apparatus 3 for measuring wavelength characteristics of the laser beam 11 whose band has been narrowed, and a wavelength controller 4 for controlling the wavelength characteristics of the laser beam 11 on the basis of the wavelength characteristics of the measured laser beam 11 with being electrically connected to the band narrowing unit 10 and the wavelength measuring apparatus 3.

The laser chamber 2 encloses laser gas such as, for example, fluorine (F2) and helium (He) at a predetermined pressure ratio. A pair of discharge electrodes (not shown) are installed in a predetermined position inside the laser chamber 2 and the laser beam 11 having a wavelength of approx. 157 nm is caused to oscillate by applying a high voltage between the discharge electrodes.

Generally in this type of F2 laser unit 1, the high voltage is applied in pulses and the laser beam 11 oscillates in pulses.

A rear window 9 at a rear end (left-handed in the drawing) of the laser chamber 2 transmits the oscillating laser beam 11 and then the laser beam is incident on the band narrowing unit 10 arranged externally at the back of the laser chamber 2.

The band narrowing unit 10 has, for example, two prisms 32, 32 and a grating 33 for selecting an oscillating wavelength of the laser beam 11. The laser beam 11 whose beam width is expanded by the two prisms 32, 32 is incident on the grating 33 and diffracted, by which only the laser beam 11 having predetermined wavelength characteristics is reflected in the same direction as for the incident beam. This grating 33 is a wavelength selecting element, which narrows the band of the laser beam 11.

Then the grating 33 is mounted on a rotary actuator 34 rotating on the basis of an output signal from the wavelength controller 4. The wavelength controller 4 changes an incident angle to the grating 33 of the laser beam 11 by rotating the rotary actuator 34 to control the wavelength characteristics of the laser beam 11.

The laser beam 11 whose band has been narrowed is emitted from the band narrowing unit 10, passes through the laser chamber 2, and penetrates through a front window 7 at a front end of the laser chamber 2. A part of the laser beam 11 which has penetrated through the front window 7 is partially reflected by the front mirror 8 arranged externally ahead of the laser chamber 2 so as to return to the inside of the laser chamber 2, while residual laser beam 11 partially penetrates through the front mirror 8 so as to be emitted to the outside of the F2 laser unit 1.

There is provided a beam splitter 12 for sampling a part of the laser beam 11 on an optical axis of the emitted laser beam 11. The laser beam 11 is partially reflected downward by this beam splitter 12 and then it is incident on the wavelength measuring apparatus 3 as a sample beam 11A. At this point the wavelength characteristics of the laser beam do not change even if it is reflected on the beam splitter 12 and therefore the wavelength characteristics of the laser beam 11 can be known by measuring wavelength characteristics of the sample beam 11A.

The wavelength measuring apparatus 3 measures the wavelength characteristics of the sample beam 11A by a predetermined arithmetic operation and outputs an electric signal corresponding to the wavelength characteristics to the wavelength controller 4. The wavelength controller 4 outputs a command signal to the band narrowing unit 10 on the basis of detected values of the wavelength characteristics and rotates the rotary actuator 34 on which the grating 33 is mounted so as to control the wavelength characteristics of the laser beam 11.

Next, the wavelength measuring apparatus 3 is described in detail below.

The wavelength measuring apparatus 3 comprises a diffuser panel 24 for diffusing the incident sample beam 11A, a monitor etalon 25 for generating an interference pattern 29 corresponding to the wavelength characteristics of the diffused sample beam 11A, and a first imaging lens 27 for imaging this interference pattern 29.

In addition, the wavelength measuring apparatus 3 comprises a fluorescent screen 15 for generating a fluorescent pattern 14 having an intensity distribution corresponding to an intensity distribution of the imaged interference pattern 29 in the above, a second imaging lens 30 for imaging the fluorescent pattern 14 generated from this fluorescent screen 15, and a pattern detector 17 for measuring the intensity distribution of the imaged fluorescent pattern 14, and an arithmetic unit 28 for calculating the wavelength characteristics of the laser beam 11 on the basis of the intensity distribution of the measured fluorescent pattern 14.

The sample beam 11A incident on the wavelength measuring apparatus 3 is diffused by the diffuser panel 24, so that the intensity distribution is unified and then it is incident on the monitor etalon 25 for generating the interference pattern corresponding to the wavelength characteristics. Referring to FIG. 2, there is shown an example of a one-dimensional intensity distribution of the interference pattern generated by the monitor etalon 25. In this graph, the ordinate axis corresponds to a coordinate of an intensity of the interference pattern 29 to a predetermined coordinate in the X direction, while the abscissa axis corresponds to a coordinate in the X direction, for example, in FIG. 1. A fringe interval 29A of the interference pattern 29 indicates a center wavelength of the sample beam 11A and a fringe width 29B of the interference pattern 29 indicates a spectral width of the sample beam 11A.

In FIG. 1, the interference pattern 29 generated by the monitor etalon 25 is imaged by the first imaging lens 27 on the fluorescent screen 15 arranged on the optical axis (downward in the drawing) of the sample beam 11A with being coated on its surface with a fluorescent substance 16 or including it inside.

This type of fluorescent screen 15 generates a fluorescent pattern 14 having an intensity distribution corresponding to an intensity distribution of the incident interference pattern 29 and having a longer wavelength (generally a visible light) than the wavelength of the interference pattern 29 in a direction of penetrating through the fluorescent screen 15 (downward in the drawing). The generated fluorescent pattern 14 is imaged by a second imaging lens 30 on the pattern detector 17 having a line sensor or the like.

This pattern detector 17 measures the intensity distribution of the imaged fluorescent pattern 14 to detect the fringe interval 29A and the fringe width 29B of the interference pattern 29 and transmits an electric signal corresponding to them to the arithmetic unit 28. The arithmetic unit 28 performs an arithmetic operation on the basis of the received electric signal to calculate wavelength characteristics comprising a center wavelength and a spectral width of the sample beam 11A and transmits data of the calculated wavelength characteristics to the wavelength controller 4. The wavelength controller 4 outputs a command signal to the band narrowing unit 10 on the basis of the data of the wavelength characteristics to control the wavelength characteristics of the laser beam 11 so as to be predetermined values.

Preferably a material of the fluorescent screen 15 does not transmit lights in the vacuum ultraviolet region almost at all and transmits almost all of the lights having a wavelength close to the wavelength of the fluorescent light 14; for example, an optical glass BK7 or the like is preferable. This suppresses the sample beam 11A to reach the pattern detector 17, thereby making it hard to damage the wavelength measuring apparatus 3.

Otherwise, it is possible to use a material including a fluorescent substance 16 inside, for example, a fluorescent glass (material having a trade name Lumilass made by Sumita Optical Glass, Inc.).

A material of the fluorescent substance 16 is preferably a phosphate fluorescent substance (known as phosphor) or rare earth ions. Furthermore, a BK7 or other glass plate coated with salicylic acid may be used as the fluorescent screen 15.

In another preferable embodiment, it is preferable to provide an ultraviolet filter 20, which does not transmit the laser beam in the vacuum ultraviolet region and transmits the laser beam having a wavelength close to the wavelength of the fluorescent pattern 14 so that the sample beam 11A irregularly reflected on the surface or the like of the fluorescent screen 15 does not reach the pattern detector 17, in front of the pattern detector 17.

Furthermore, an intensity of the fluorescent pattern 14 generated on the fluorescent screen 15 is accurately proportional to an intensity of the interference pattern 19 incident on the fluorescent screen 15. If the intensity of the interference pattern 29 is proportional to the intensity of the fluorescent pattern 14, the wavelength characteristics of the sample beam 11A can be easily detected by measuring the intensity distribution of the fluorescent pattern 14.

Unless the intensity of the fluorescent pattern 14 generated on the fluorescent screen 15 is proportional to the intensity of the interference pattern 29, a relation between the intensity of the incident interference pattern 29 and the intensity of the fluorescent pattern 14 is previously examined and then the wavelength characteristics may be calculated by the arithmetic unit 28 with the relation corrected.

A beam in the vacuum ultraviolet region is well absorbed by oxygen in the air and therefore power of the laser beam 11 is significantly attenuated by passing through the air. To prevent this attenuation, a cover 22 is put on an entire optical path of the laser beam 11 and the sample beam 11A, the wavelength measuring apparatus 3, and the band narrowing unit 10. Preferably an inside space shielded by the cover 22 is kept in the oxygen-free condition by evacuation with a vacuum pump which is not shown or by purging the inside with a gas not including oxygen by purge means which is not shown.

If the fluorescent screen 15 is continuously irradiated with the interference pattern 29 for a long period of time, energy of the photon of the interference pattern 29 deteriorates the fluorescent substance 16 in the portion to which the interference pattern 29 is applied, thereby hindering the generation of the fluorescent pattern 14 having the intensity distribution corresponding to the intensity distribution of the incident interference pattern 29.

To prevent the deterioration of the fluorescent substance 16, it is preferable to provide a movable actuator 21 which can move by a predetermined distance in a direction (X or Y direction in the drawing) perpendicular to the optical axis of the sample beam 11A and to movably install the fluorescent screen 15 by using the movable actuator 21.

The number of pulses of the pulse-oscillating laser beam 11 is counted by the arithmetic unit 28. Then, the fluorescent screen 15 is moved by the predetermined distance by using the movable actuator 21 on the basis of a signal from the arithmetic unit 28 whenever the fluorescent screen 15 is irradiated with the interference pattern 29 by the predetermined number of pulses so as to change the irradiated position of the sample beam 11A. This results in a decrease of the deterioration of the fluorescent substance 16, thereby extending a life of the fluorescent screen 15.

Figure 3:
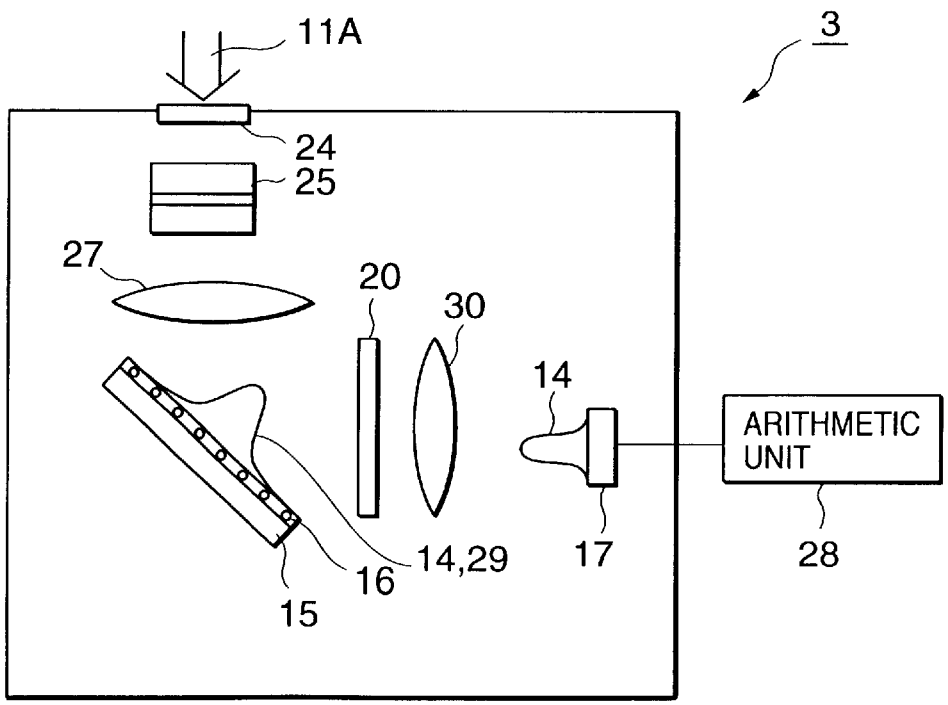
FIG. 3 is a configurational diagram showing another sample configuration of the wavelength measuring apparatus according to the first embodiment.

Referring to FIG. 3, there is shown another sample configuration of a wavelength measuring apparatus 3 according to this embodiment.

In FIG. 3, the interference pattern 29 imaged by the first imaging lens 27 is obliquely incident at a predetermined incident angle on the fluorescent screen 15 coated on its surface in one side with the fluorescent substance 16. This fluorescent screen 15 causes the fluorescent pattern 14 having the intensity distribution corresponding to the intensity distribution of the incident interference pattern 29 to be generated on the surface in the side.

The generated fluorescent pattern 14 is imaged on the pattern detector 17 having a CCD or the like by using the second imaging lens 30. The intensity distribution of the fluorescent pattern 14 is detected by the pattern detector 17 on the basis of this image and further the wavelength characteristics of the sample beam 11A are calculated by the arithmetic unit 28.

Figure 4:
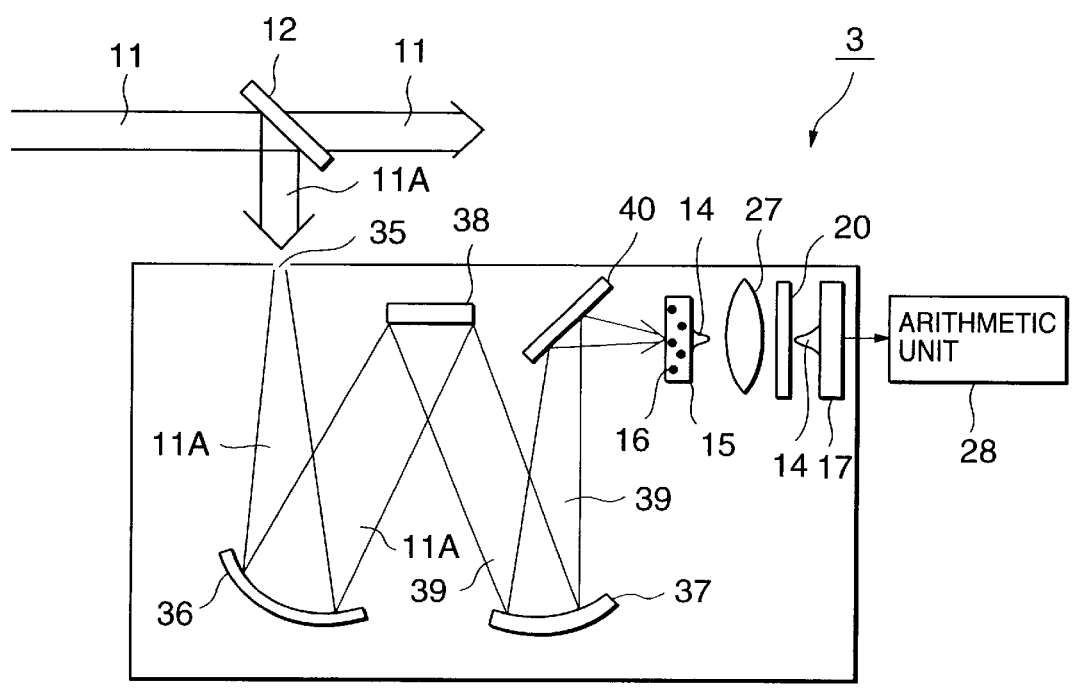
FIG. 4 is a configurational diagram of a wavelength measuring apparatus according to a second embodiment of the present invention.
Figure 5:
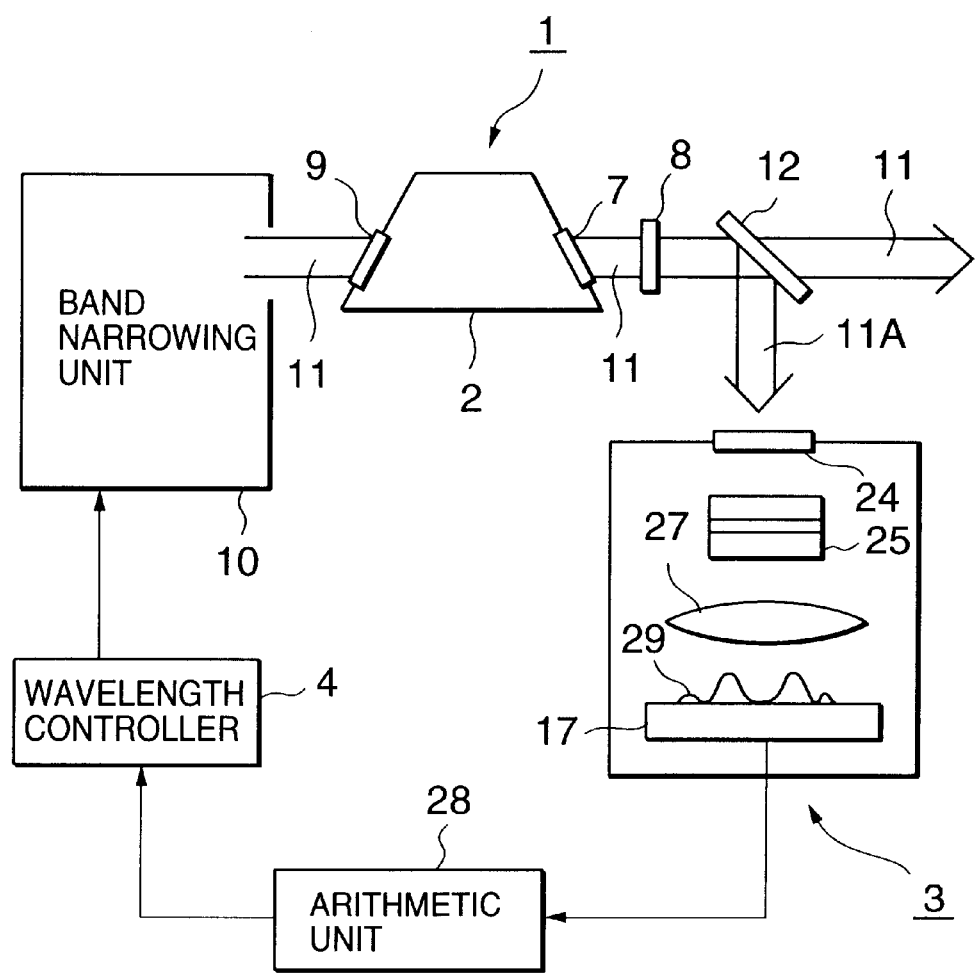
FIG. 5 is a configurational diagram of an F2 laser unit having a wavelength measuring apparatus according to a prior art.

Next, a second embodiment will be described below by referring to FIG. 4. Referring to FIG. 4, there is shown a configurational diagram of a wavelength measuring apparatus 3 according to this embodiment.

The wavelength measuring apparatus 3 comprises two concave mirrors 36 and 37, a diffraction grating 38 for diffracting a sample beam 11A at an angle corresponding to wavelength characteristics of an incident sample beam 11A, a fluorescent screen 15 for generating a fluorescent pattern 14 having an intensity distribution corresponding to an intensity distribution of a diffracted beam 39, an imaging lens 27 for imaging the fluorescent pattern 14, a pattern detector 17 for measuring an intensity distribution of the formed image, and an arithmetic unit 28 for calculating wavelength characteristics of the sample beam 11A on the basis of this intensity distribution.

A laser beam 11 emitted from an F2 laser unit which is not shown is partially reflected on a beam splitter 12 put on an optical axis and then it is incident on the wavelength measuring apparatus 3 as a sample beam 11A.

The sample beam 11A diffracted and diffused at a pinhole 35 is shaped into an almost parallel beam by a first concave mirror 36 and then incident on the diffraction grating 38. The diffraction grating 38 diffracts the sample beam 11A at an angle corresponding to its wavelength characteristics and emits a diffracted beam 39. The diffracted beam 39 is condensed in a predetermined condensing position via a second concave mirror 37 and a mirror 40. In other words, the wavelength characteristics of the sample beam 11A can be measured by detecting an intensity distribution of the condensed diffracted beam 39.

When they are measured by causing this diffracted beam 39 to be incident directly on the pattern detector 17, however, there is such a problem that the pattern detector 17 is damaged in the same manner as for the prior art.

Therefore in this embodiment, the fluorescent screen 15 is arranged in the condensing position so that the diffracted beam 39 is condensed in one side of the fluorescent screen 15. This results in a generation of a fluorescent pattern 14 corresponding to the intensity distribution of the diffracted beam 39 in the other side of the fluorescent screen 15. The intensity distribution of the fluorescent pattern 14 is imaged on the pattern detector 17 by using the imaging lens 27 to detect the intensity distribution, by which the wavelength characteristics of the sample beam 11A can be measured.

As set forth hereinabove, according to the present invention, an optical pattern (according to the first and second embodiment, the interference pattern 29 and the diffracted beam 39, respectively) corresponding to wavelength characteristics of a laser beam 11 or a sample beam 11A is generated by spectral means (according to the first and second embodiment, the monitor etalon 25 and the diffraction grating 38, respectively). Then, the optical pattern 29 or 39 is applied to a fluorescent screen 15 and an intensity distribution of a fluorescent pattern 14 generated on the fluorescent screen 15 is measured by a pattern detector 17 so as to detect wavelength characteristics of the laser beam 11.

In other words, the wavelength characteristics of the laser beam 11 can be measured without the laser beam 11 directly incident on the pattern detector 17. A fluorescent light emitted from the fluorescent pattern 14 has a longer wavelength than that of the laser beam 11 in a vacuum ultraviolet region and therefore energy of photons is small, thereby not damaging the pattern detector 17 unlike the directly incident laser beam 11. This results in a reduction of troubles of the wavelength measuring apparatus 3, by which an operating efficiency of the F2 laser unit 1 is improved.

In addition, the wavelength characteristics of the laser beam 11 can be measured accurately for a long period of time, thus enabling a precise control of the wavelength characteristics for a long period on the basis of the measurements. Therefore, an object to be processed can be accurately irradiated with the laser beam 11 having the predetermined wavelength characteristics when the F2 laser unit 1 is used as a light source for precision processing such as laser lithography, by which favorable processing is enabled.

Furthermore, in the first and second embodiments, a part of the laser beam 11 is taken out as the sample beam 11A by using the beam splitter 12 to measure the wavelength characteristics of the laser beam 11 constantly. The present invention, however, is not limited to these embodiments, but it is also applicable to a case in which the wavelength characteristics of the laser beam 11 are measured at predetermined time intervals regularly (for example, once a day).

In other words, in FIG. 1, the beam splitter 12 is not arranged at the normal oscillation, but a total reflecting mirror is arranged in the same position as the beam splitter 12 only when the wavelength of the laser beam 11 is measured. Then, the laser beam 11 totally reflected on the total reflecting mirror or the laser beam 11 partially absorbed by a filter or the like may be caused to be incident on the wavelength measuring apparatus 3 so as to detect the wavelength characteristics of the laser beam 11 on the basis of the generated fluorescent pattern 14. Otherwise, the beam splitter 12 and the total reflecting mirror are not arranged, but the wavelength measuring apparatus 3 is arranged on an optical axis of the laser beam 11 and the laser beam 11 or the laser beam 11 partially absorbed by a filter or the like may be caused to be incident on the wavelength measuring apparatus 3 so as to directly measure the wavelength characteristics of the laser beam 11.

The grating 33 is provided as a wavelength selecting element inside the band narrowing unit 10 to narrow the band of the laser beam 11 and the gratin 33 is turned relative to the laser beam 11, by which the wavelength characteristics of the laser beam 11 are controlled. The present invention, however, is not limited to this embodiment, but for example, it is also possible to provide an etalon inside the band narrowing unit 10 to narrow the band of the laser beam 11 and to change an incident angle of the laser beam 11 to the etalon for controlling the wavelength characteristics of the laser beam 11.

While the F2 laser unit has been described as an example of a vacuum ultraviolet laser, it is not limited to this, but it is only required to be a laser emitting a light having a wavelength in the vacuum ultraviolet region (approx. 20 nm to 200 nm). The vacuum ultraviolet laser covers, for example, an ArF laser, an ArCl laser, an Xe2 laser, a Kr2 laser, an Ar2 laser, an H2 laser, an H2 Raman laser, an Xe Auger laser and the like. The present invention is also applicable to measuring wavelength characteristics of these vacuum ultraviolet lasers.

What is claimed is:

1. A vacuum ultraviolet laser wavelength measuring apparatus having spectral means for generating an optical pattern corresponding to wavelength characteristics of an incident laser beam and measuring wavelength characteristics of a laser beam in a vacuum ultraviolet region oscillating from a vacuum ultraviolet laser on the basis of the optical pattern, comprising:

a fluorescent screen for generating a fluorescent pattern, with use of a first imaging lens, having an intensity distribution corresponding to an intensity distribution of the incident optical pattern;

a pattern detector for measuring the intensity distribution of the fluorescent pattern generated from the fluorescent screen; and an arithmetic unit for calculating the wavelength characteristics of said laser beam on the basis of the intensity distribution of the measured fluorescent pattern, wherein said fluorescent screen is coated with a fluorescent substance on its surface in one side, said optical pattern is caused to be obliquely incident on the fluorescent screen, the fluorescent pattern having the intensity distribution corresponding to the intensity distribution of the obliquely incident optical pattern is generated on the surface in the side, and the fluorescent pattern is imaged on said pattern detector by using a second imaging lens.

2. A vacuum ultraviolet laser wavelength measuring apparatus having spectral means for generating an optical pattern corresponding to wavelength characteristics of an incident laser beam and measuring wavelength characteristics of a laser beam in a vacuum ultraviolet region oscillating from a vacuum ultraviolet laser on the basis of the optical pattern, comprising:

a fluorescent screen for generating a fluorescent pattern, with use of a first imaging lens, having an intensity distribution corresponding to an intensity distribution of the incident optical pattern;

a pattern detector for measuring the intensity distribution of the fluorescent pattern generated from the fluorescent screen; and an arithmetic unit for calculating the wavelength characteristics of said laser beam on the basis of the intensity distribution of the measured fluorescent pattern, wherein said spectral means comprises a plurality of concave mirrors and a diffraction grating for diffracting a laser beam at an angle corresponding to the wavelength characteristics of the incident laser beam, wherein the diffracted beam is condensed in one side of said fluorescent screen, the fluorescent pattern having an intensity distribution corresponding to an intensity distribution of the diffracted beam is generated in the other side of said fluorescent screen, and the fluorescent pattern is imaged on said pattern detector by using a second imaging lens.

3. A vacuum ultraviolet laser wavelength measuring apparatus according to claim 1 or 2, wherein an ultraviolet filter which does not transmit the laser beam in the vacuum ultraviolet region and transmits the laser beam having a wavelength close to a wavelength of the fluorescent pattern in the front of said pattern detector.

4. A vacuum ultraviolet laser wavelength measuring apparatus according to claim 1 or 2, wherein a cover is put on at least an entire optical path of said laser beam and said wavelength measuring apparatus and a space inside the cover is kept in an oxygen-free condition.

5. A vacuum ultraviolet laser wavelength measuring apparatus according to claim 1 or 2, wherein said fluorescent screen has a movable actuator which is movable by a predetermined distance perpendicularly to an optical axis of the incident laser beam and is movably installed by this movable actuator.

6. A vacuum ultraviolet laser wavelength measuring apparatus having spectral means for generating an optical pattern corresponding to wavelength characteristics of an incident laser beam and measuring wavelength characteristics of a laser beam in a vacuum ultraviolet region oscillating from a vacuum ultraviolet laser on the basis of the optical pattern, comprising:

a fluorescent screen for generating a fluorescent pattern, with use of a first imaging lens, having an intensity distribution corresponding to an intensity distribution of the incident optical pattern;

a pattern detector for measuring the intensity distribution of the fluorescent pattern generated from the fluorescent screen;

an arithmetic unit for calculating the wavelength characteristics of said laser beam on the basis of the intensity distribution of the measured fluorescent pattern, and an ultraviolet filter which does not transmit the laser beam in the vacuum ultraviolet region and transmits the laser beam having a wavelength close to a wavelength of the fluorescent pattern in the front of said pattern detector.

7. A vacuum ultraviolet laser wavelength measuring apparatus having spectral means for generating an optical pattern corresponding to wavelength characteristics of an incident laser beam and measuring wavelength characteristics of a laser beam in a vacuum ultraviolet region oscillating from a vacuum ultraviolet laser on the basis of the optical pattern, comprising:

a fluorescent screen for generating a fluorescent pattern, with use of a first imaging lens, having an intensity distribution corresponding to an intensity distribution of the incident optical pattern;

a pattern detector for measuring the intensity distribution of the fluorescent pattern generated from the fluorescent screen;

an arithmetic unit for calculating the wavelength characteristics of said laser beam on the basis of the intensity distribution of the measured fluorescent pattern, wherein said fluorescent screen has a movable actuator which is movable by a predetermined distance perpendicularly to an optical axis of the incident laser beam and is movably installed by this movable actuator.

* * * * *